United States Patent [19]

Manschitz et al.

[11] Patent Number: 5,678,641
[45] Date of Patent: Oct. 21, 1997

[54] DRILLING AND CHIPPING TOOL

[75] Inventors: Erwin Manschitz, Germering, Germany; Michael Selb, Feldkirch; Dirk Schinkitz, Ludesch, both of Austria

[73] Assignee: Hilti Aktiengeschaft, Fürstentum, Liechtenstein

[21] Appl. No.: 433,278

[22] Filed: May 2, 1995

[30] Foreign Application Priority Data

May 2, 1994 [DE] Germany .................. 44 15 348.1

[51] Int. Cl.[6] ...................... B23B 45/16; B25D 16/00
[52] U.S. Cl. .................. 173/114; 173/48; 173/104; 173/117; 173/13
[58] Field of Search ............... 173/47, 48, 104, 173/117, 114, 13, 14, 15

[56] References Cited

U.S. PATENT DOCUMENTS

| 3,203,490 | 8/1965 | McCarty et al. ............ 173/17 |
| 3,921,729 | 11/1975 | Schmuck ................... 173/104 |
| 4,763,733 | 8/1988 | Neumaier .................. 173/48 |
| 4,998,588 | 3/1991 | Manschitz ................. 173/47 |

FOREIGN PATENT DOCUMENTS

| 0042010 | 12/1981 | European Pat. Off. . |
| 7522846 | 2/1976 | France . |
| 3405922 | 8/1985 | Germany . |
| 2136722 | 9/1984 | United Kingdom . |

*Primary Examiner*—Jack W. Lavinder
*Assistant Examiner*—Jay A. Stelacone
*Attorney, Agent, or Firm*—Anderson Kill & Olick, P.C.

[57] ABSTRACT

A drilling and/or chipping tool includes a housing (30) containing a guide tube (36) with a striking mechanism (28) located within the guide tube, with the guide tube and striking mechanism being displaceable in the striking direction relative to the housing. Damping elements abut between the guide tube and the housing. Rotary motion is transmitted from a drive motor (31), located in a stationary position within the housing, in a wear-free manner to a crankshaft (34) of the striking mechanism (28) by an axial displaceable compensation element (33), so that the striking mechanism is displaceable in the striking direction relative to the drive shaft (32) of the drive motor (31).

9 Claims, 4 Drawing Sheets

DRILLING AND CHIPPING TOOL

BACKGROUND OF THE INVENTION

The present invention is directed to a drilling and/or chipping tool including a housing, a striking mechanism with an exciter piston and at least one crankshaft located within that housing, a drive motor fixed in the housing and including a drive shaft and a gear unit positioned between the drive motor and the striking mechanism. The striking mechanism is arranged to be displaceable relative to the housing parallel to its striking direction with damping elements located between the striking mechanism and the housing.

There is a known drilling and/or chipping tool disclosed in DE-PS 34 05 922 including a drive motor, a striking mechanism and a gear unit, where the striking mechanism forms a mass whose vibrations are isolated from the housing and with the mass being supported parallel to the striking direction of the striking mechanism so as to be displaceable in the housing while it is abutted against the housing by damping element. Accordingly, shocks and vibrations caused by the rebound of the tool bits are transmitted in a damped state to the housing and the handle rigidly connected to the housing.

The drive motor fixed in the housing forms along with the housing a residual mass for counteracting the acceleration of the vibrating mass. The drive motor drives the striking mechanism and the driveshaft of the drive motor is disposed perpendicularly to the striking direction of the striking mechanism. During displacement of the striking mechanism afforded by the damping elements, there is a corresponding displacement of the crankshaft relative to the drive shaft of the drive motor which is fixed in the housing. A toothed region of the crankshaft projects into an internal toothed region of a pinion of the gear unit and can be non-rotatably displaced therein to an axially limited extend.

This known drilling and/or chipping tool has the disadvantage that the toothed region of the crank shaft and of the pinion wear out rapidly because of the continuous friction occurring during axial displacement.

SUMMARY OF THE INVENTION

Therefore, the primary object of the present invention is to provide a drilling and/or chipping tool where the transmission of rotary motion from the drive motor to the displaceable striking mechanism takes place without any wear.

In accordance with the present invention, the axis of rotation of the crankshaft of the striking mechanism extends substantially perpendicularly to the striking direction of the striking mechanism and an axial displacement compensation element operating parallel to the striking direction of the striking mechanism is located between the drive motor and the striking mechanism.

During displacement of the crankshaft in the operation of the tool relative to the drive shaft of the drive motor parallel to the striking direction of the striking mechanism, the rotary motion or the torque of the drive motor is transmitted to the crank shaft of the striking mechanism without any wear by the axial displacement compensation element of the invention. The drive motor is arranged so that its drive shaft extends substantially coaxially relative to the crank shaft of the striking mechanism in its inoperative position.

To achieve a specific revolutions per minute of the crankshaft, which is different from the revolutions per minute of the drive shaft of the drive motor, it is necessary to position a gear unit between the drive motor and the striking mechanism. Preferably, the gear unit is located between the drive motor and the axial displacement compensation element. In such arrangement, the housing has bearing points for the gear unit, so that it is fixed within the drilling and/or chipping tool housing. The drive motor can be arranged so that the drive shaft can be displaced offset relative to the crank shaft of the striking mechanism in its inoperative condition.

The axial displacement compensation element transmits the rotary motion of the drive shaft of the drive motor to the crankshaft of the striking mechanism, and advantageously the axial displacement compensation element is shaped as a crown tooth coupling. Such an axial displacement compensation element made up of few parts can be fabricated economically. In the crown tooth coupling of the invention, the crankshaft of the striking mechanism has an external set of teeth cooperating with an internal set of teeth in a coupling shaft, where the external teeth are crowned and arc-shaped while the internal teeth have an appropriate matching configuration.

In the gear unit, a pinion has an external set of teeth cooperating with the drive shaft of the drive motor and an internal set of teeth cooperating with an external set of teeth on the coupling shaft. The external teeth on the coupling shaft are crowned or arc-shaped and the internal teeth have a corresponding matching shape. This affords a multi-directional or universal angular mobility of the coupling shaft.

When the crankshaft is displaced in a parallel manner relative to the drive shaft of the drive motor or to the pinion of the transmission gear, a spacing arises between the crank shaft and the drive shaft or the pinion. This spacing is compensated or equalized by an arc-shaped recess at the base of the internal teeth and by a corresponding arc-shaped protrusion at the end region of the coupling shaft carrying the external teeth. Thus, the axial clearance of the coupling shaft is constant in every angular position.

Preferably, the coupling shaft is fabricated from plastics material to create a maintenance-free coupling having a low moment of the inertia and low weight while being resistant to oil and chemicals.

Preferably, the axial displaceable compensation element is a cross disc type coupling. In this cross disc type coupling, also called an Oldham compensation coupling, simple and low cost fabricatable parts cooperate. The crank shaft of the striking mechanism and the pinion of the gear unit are each connected to a hub and the hubs have slots into which cams of an intermediate disc are seated angularly offset with respect to one another.

Advantageously, the axial displacement compensation element is shaped as a parallel crank-type coupling. In such parallel crank-type coupling, also known as a Schmidt coupling, The rotatable pinion of the gear unit, fixed at the housing, is in fixed connection with a disc and the crankshaft is in fixed connection with a bearing or support disc. An intermediate disc is located between the two discs. The disc, the intermediate disc and the bearing or support disc are connected to one another by pins in guide links of equal lengths, in such a way that two parallel crank-type gear systems disposed consecutively are formed and the rotary motion is transmitted in an angularly conformed matter.

The various features of novelty which characterize the invention are pointed out with particularity in the claims annexed to and forming apart of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
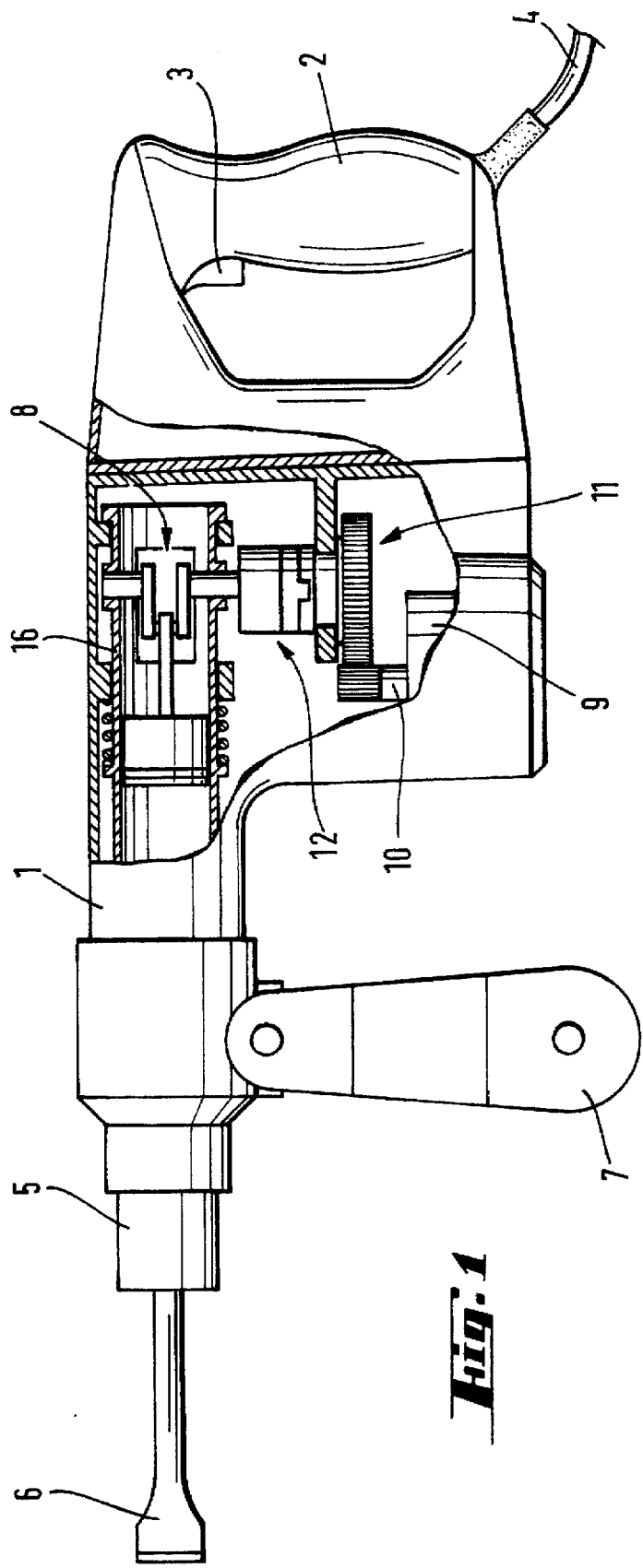
FIG. 1 is an axially extending side view partly in section of a drilling and/or chipping tool embodying the present invention.

In FIG. 1 a drilling and/or chipping tool is formed of a housing 1 with a handle 2 at one and containing a switch or trigger 3 for operating the tool, and a electrical cable 4 for supplying current to the tool. At the opposite end from the handle a tool bit holder 5 is located on the front end of the housing with a tool bit 6 positioned in the holder. Adjacent the tool bit holder 5 is an auxiliary handle 7 projecting downwardly from the housing. A cylindrical guide tube 16 is located within the housing and a striking mechanism 8, shown diagrammatically is mounted in the guide tube within the housing. The striking direction of the striking mechanism extends in the axial direction of the guide tube 16 corresponding to the axial direction of the housing 1. A drive motor 9, located within the housing 1 has a drive shaft 10, shown diagrammatically, for propelling the striking mechanism. The drive shaft 10 operates the striking mechanism 8 through a gear unit 11 and an axial displacement compensation element 12.

Figure 2:
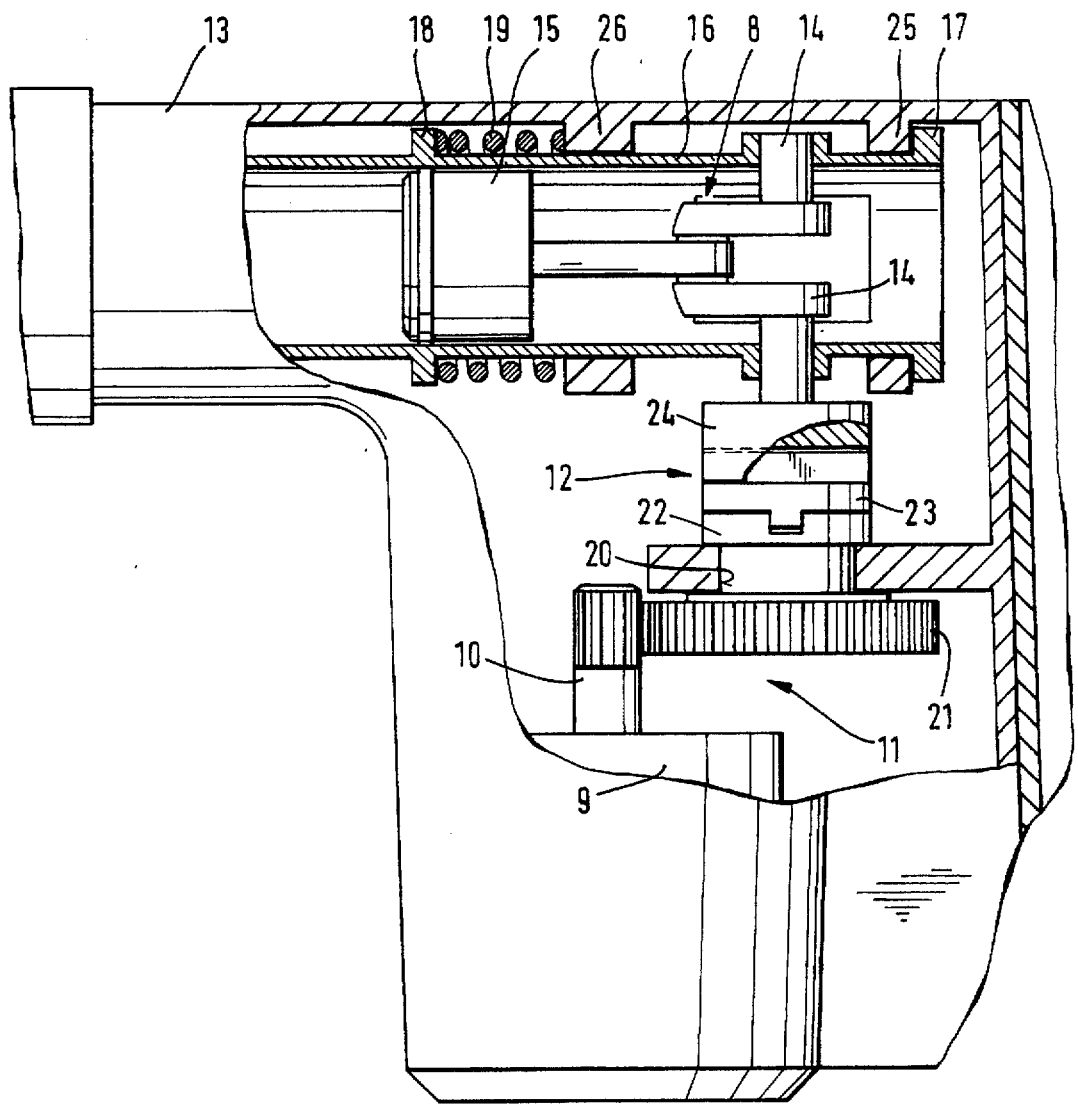
FIG. 2 is a portion of a drilling and/or chipping tool, partly in section, with a cross disc type coupling embodying the present invention.
Figure 3:
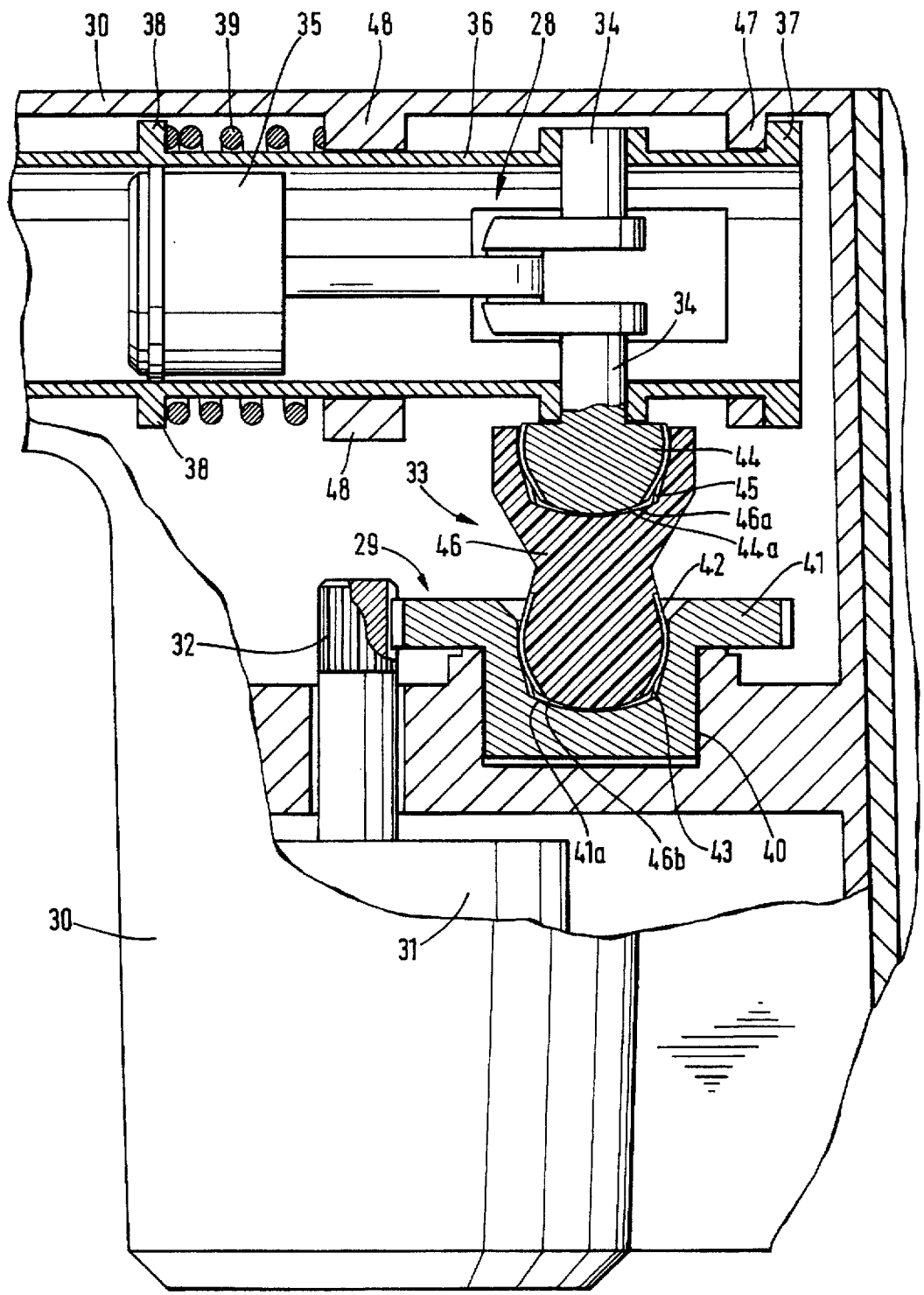
FIG. 3 is a portion of a drilling and/or chipping tool with a crown type coupling embodying the present invention.
Figure 4:
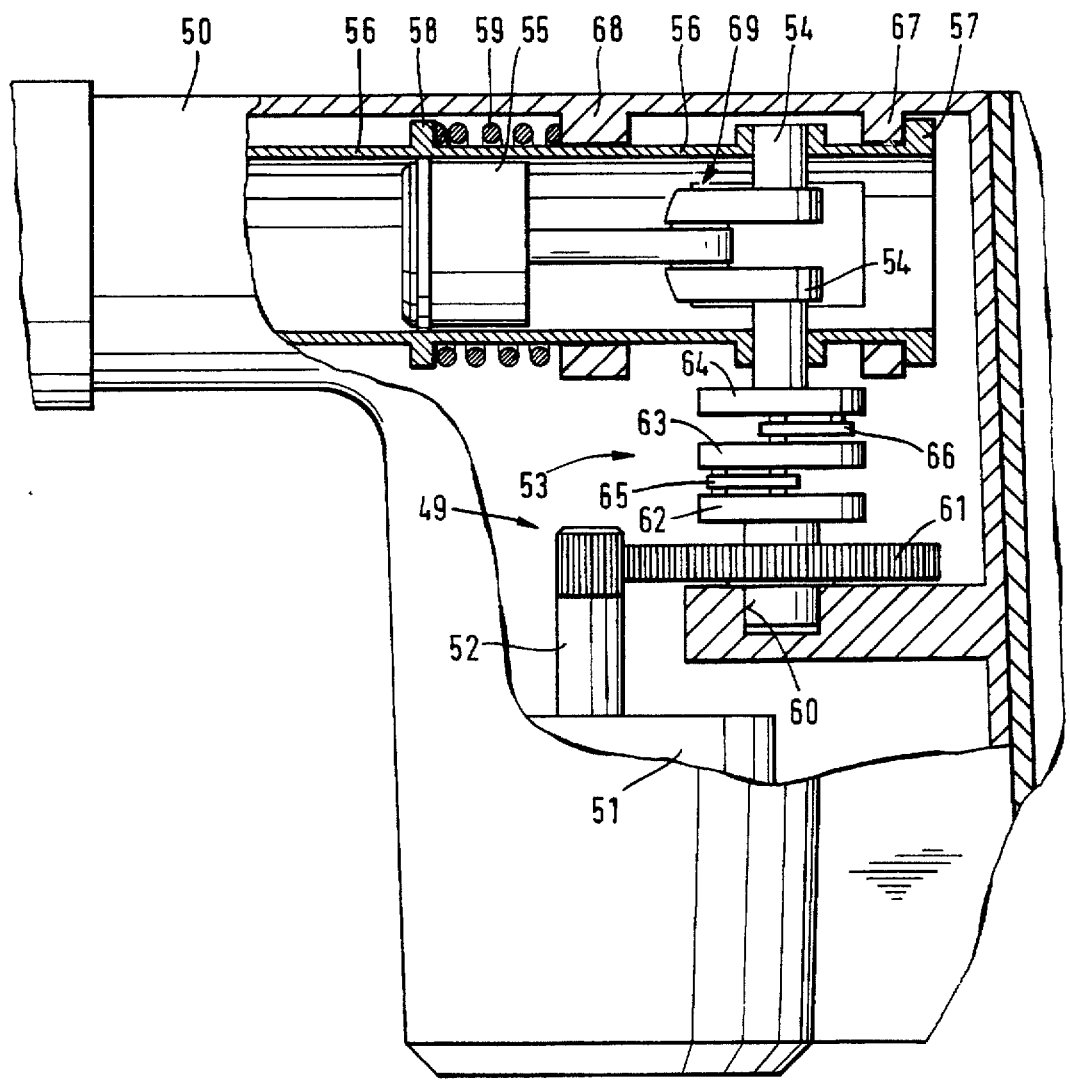
FIG. 4 is a portion of a drilling and/or chipping tool with a parallel crank type coupling embodying the present invention.

In FIGS. 2, 3 and 4 three different embodiments of the drilling and/or chipping tool of the present invention are illustrated on an enlarged scale as compared to FIG. 1. Each of the illustrated tools has an essentially cylindrical guide tube 16, 36, 56 with radially outwardly extending projections 17, 18; 37, 38; 57, 58 disposed in axially spaced relation. The housing 13, 30, 50, has radially inwardly extending guides 25, 26; 47, 48; 67, 68 affording axially guided displaceability between the guide tube and the housing. A spring 19, 39, 59 extends around the outside of the guide tube 16, 36, 56 and extends between the housing guide 26, 48, 68 on the housing 13, 30, 50 and the projection 18, 38, 58 on the guide tubes 16, 36, 56 and biases the projection 17, 37, 57 against a rearwardly facing side of the housing guide 25, 47, 67.

A two part crankshaft 14, 34, 54 is located in the guide tube 16, 36, 56 and the crankshaft axis of rotation extends perpendicularly to the central axis of the guide tube 16, 36, 56. Crankshaft 14, 34, 54 is supported in through openings in the guide tube 16, 36, 56. An exciter piston 15, 35, 55 is connected by a rod to the crankshaft 14, 34, 54 with the exciter piston being displaceable within and in the axial direction of the guide tube 16, 36, 56. The exciter piston 15, 35, 55 is sealed against the inside surface of the guide tube 16, 36, 56 by a sealing ring in the form of an 0-ring located around the outer circumference of the exciter piston.

The striking mechanism 8, 28, 69 is formed of the crank shaft 14, 34, 54 a striker piston, not shown, and the exciter piston 15, 35, 55 is located between the crankshaft and the striker piston and is connected by a rod to the crankshaft, and the striking mechanism is driven by the drive motor 9, 31, 51 equipped with the drive shaft 10, 32, 52. The axis of rotation of the drive shaft 10, 32, 52 extends substantially perpendicularly to the central axis of the guide tube 16, 36, 56. Drive motor 9, 31, 51 is fixed to the housing 13, 30, 50. Drive shaft 10, 32, 52 has a set of teeth and forms part of the gear unit 11, 29, 49 also fixed within the housing 13, 30, 50. Pinion 21, 41, 61 forms another part of the gear unit 11, 29, 49.

When the striking mechanism 8, 28, 69 is actuated, the exciter piston 15, 35, 55 is axially displaced in the direction of the central axis of the guide tube 16, 36, 56 and axially displaces the striking piston which delivers appropriate percussive blows or impulses to a tool bit, not shown in FIGS. 2, 3 or 4. As the tool bit rebounds, an impulse is developed acting opposite to the striking direction and causes a slight axial displacement of the guide tube 16, 36, 56 opposite to the striking direction. The axial displacement of the guide tube 16, 36, 56 can also occur because of vibrations generated by a mass imbalance of the crankshaft 14, 34, 54 and the force of the gaseous medium in the striking mechanism 8, 28, 69. Therefore, the crankshaft 14, 34, 54 is supported so that it is damped along with the guide tube 16, 36, 56 relative to the housing. The axial displacement is absorbed in a flexural manner in the different embodiments by damping elements in the form of springs 19, 39, 59 disposed between the housing guide 26, 48, 68 on the housing 13, 30, 50 and the projection 18, 38, 58 on the guide tube 16, 36, 56. Axial displacement of the guide tube 16, 36, 56 also results in axial displacement of the crank shaft 14, 34, 54 of the striking mechanism 8, 28, 69. As a result, there is an axial offset or displacement of the crankshaft 14, 34, 54 relative to the pinion 21, 41, 61 of the transmission gear. An axial displacement compensation element 12, 33, 53 is positioned between the crankshaft 14, 34, 54 and the pinion 21, 41, 61 of the transmission gear 11, 29, 49 to compensate for the axial offset or displacement.

The axial displacement compensation element 12 illustrated in FIG. 2 is a cross disc type coupling, also known as an Oldham compensation coupling. The pinion 21 of the transmission gear 11 and the crank shaft 14 are each connected to a separate hub 22, 24 with a slot formed in each hub. An intermediate disc 23 is located between the hubs 22, 24 and has cams disposed at right angles to one another and engaged in the slots of the hubs 22, 24. Hub 22 is connected to the pinion 21 and is held in a stationary position at the housing 13 by a support 20. When the guide tube 16 is displaced axially, an axial offset or displacement of the hub 24 occurs relative to the stationary hub 22.

In FIG. 3 the axial displacement compensation element 33 is a crown tooth coupling where the crankshaft 34 has a hub 44 with external teeth in meshed engagement with internal teeth 45 on a coupling shaft 46. A pinion 41 of the gear unit 29 is pot shaped and has internal teeth 43 and external teeth in meshed engagement with the drive shaft 32 of the drive motor 31. Coupling shaft 46 has appropriate external teeth 42 in meshed engagement with the internal teeth 43. Coupling shaft 46 transmits torque from the pinion 41 to the crank shaft 34, by way of external teeth 42 on the coupling shaft 46. The external teeth 42 on the coupling shaft and the external teeth on the crank shaft 34 are arc shaped and have a crown-like configuration, whereby a universal angular mobility of the coupling shaft 46 is obtained. The internal teeth 45 on the coupling shaft 46 and the internal teeth 43 on the pinion 41 have a corresponding matching form. Base 41a of the pinion 41 and the base 46a of the coupling shaft 46 have an arc shaped recess. The lower end region 46b of the coupling shaft 46 has external teeth 42 and the lower end 44a of the hub 44 in engagement to with the crank shaft 34 has the external teeth with an arc shaped protruding configuration. The radius of the arc shaped recess is larger than the radius of the arc shaped protruding configuration on the hub 44 of the crank shaft 34. Pot shaped pinion 41 is stationarily rotatable in a support 40 of the housing 30.

In FIG. 4 the axial displaceable compensation element 53 is a parallel crank type coupling, also called a Schmidt coupling. The parallel crank type coupling is formed of a lower disc 62 positioned non-rotatably at the drive shaft 52 or the pinion 61, an intermediate disc 63 and an upper support disc 64 displaceable parallel to the central axis of the drive shaft. The disc are connected to one another by pins on guide links 65, 66 of equal length so that two parallel disc type gear systems disposed consecutively are formed with the rotary motion being transmitted in an angularly conformed manner. Pinion 61 forming part of the gear unit is stationarily rotatable in an appropriate support 60 of the housing 50 by means of a lug-like extension.

While specific embodiments of the invention have been shown and described in detail to illustrate the inventive principles, it will be understood that the invention may be embodied otherwise without departing from such principles.

We claim:

1. A drilling and/or chipping tool comprising a housing (13, 30, 50) having a central axis, a striking mechanism (8, 28, 69) located within said housing and having a striking direction extending parallel to said central axis, said striking mechanism includes an exciter piston (15, 35, 55) and at least a single part crankshaft (14, 34, 54), a drive motor (9, 31, 51) fixed in said housing and including a drive shaft (10, 32, 52) and a gear unit (11, 29, 49) located between said drive shaft and said striking mechanism (8, 28, 69), said striking mechanism being displaceable parallel to the central axis and abutting said housing (13, 30, 50) via damping elements, wherein the improvement comprises that said gear unit (11, 29, 49) includes a pinion (21, 41, 61) having an axis of rotation extending substantially perpendicularly to the control axis, said gear unit and pinion being fixed within said housing (13, 30, 50), said crankshaft has an axis of rotation extending substantially perpendicularly to the central axis, and an axial displacement compensation element (12, 33, 53) in engagement with and driven by said pinion (21, 41, 61) and in engagement with said striking mechanism for driving said striking mechanism, said axial displacement compensation element providing axial displacement between the axis of said crankshaft and the axis of said pinion.

2. A drilling and/or chipping tool, as set forth in claim 1, wherein said axial displacement compensation element (33) is shaped as a crown tooth coupling.

3. A drilling and/or chipping tool, as set forth in claim 2, wherein said crankshaft (34) of said striking mechanism (28) has external teeth cooperating with internal teeth (45) of a coupling shaft (46) of said axial displacement compensation element, and the external teeth of said striking mechanism are crowned or arc-shaped and the internal teeth (45) of said coupling shaft (46) have a corresponding matching shape.

4. A drilling and/or chipping tool, as set forth in claim 3, wherein said pinion (41) having external teeth cooperating with teeth on said drive shaft (32) of the said drive motor (31) and internal teeth (43) cooperating with external teeth (42) on said coupling shaft (46), and the external teeth (42) are crowned or arc-shaped and the internal teeth (43) have a corresponding matching shape.

5. A drilling and/or chipping tool, as set forth in claim 4, wherein said coupling shaft (46) is formed of a plastics material.

6. A drilling and/or chipping tool, as set forth in claim 1, wherein said axial displacement compensation element (12) is a cross disc type coupling.

7. A drilling and/or chipping tool, as set forth in claim 6, wherein said crankshaft (14) and said pinion (21) of said gear unit (11) are each connected to a separate hub (22, 24) and said hubs (22, 24) each has a slot into which cams of an intermediate disc (23) projects with said cams disposed perpendicularly to one another.

8. A drilling and/or chipping tool, as set forth in claim 1, wherein said axial displaceable compensation element (53) is a parallel crank type coupling.

9. A drilling and/or chipping tool, as set forth in claim 8, a first disc (62) fixed to said pinion (61), a second disc (64) is fixed to said crankshaft (54), and an intermediate disc (63) located between and space from said first and second discs, and guide links (65, 66) connecting said intermediate disc to each of the said first and second discs.

* * * * *

UNITED STATES PATENT AND TRADEMARK OFFICE
CERTIFICATE OF CORRECTION

PATENT NO. : 5,678,641
DATED : October 21, 1997
INVENTOR(S) : Erwin Manschitz, et al It is certified that error appears in the above-identified patent and that said Letters Patent is hereby corrected as shown below:

{73} Assignee:  Hilti Aktiengesellschaft, Fürstentum, Liechtenstein

Signed and Sealed this

Tenth Day of February, 1998

Attest:

BRUCE LEHMAN

Attesting Officer   Commissioner of Patents and Trademarks